United States Patent
Chinn et al.

(10) Patent No.: US 12,367,714 B2
(45) Date of Patent: Jul. 22, 2025

(54) METHOD AND SYSTEM FOR DYNAMIC TOLL AGENCY ENROLLMENT

(71) Applicant: VM Consolidated, Inc., Mesa, AZ (US)

(72) Inventors: Cathi Chinn, Phoenix, AZ (US); Stephen C. Young, Phoenix, AZ (US)

(73) Assignee: VM Consolidated, Inc., Mesa, AZ (US)

( * ) Notice: Subject to any disclaimer, the term of this patent is extended or adjusted under 35 U.S.C. 154(b) by 57 days.

(21) Appl. No.: 18/375,927

(22) Filed: Oct. 2, 2023

(65) Prior Publication Data
US 2025/0111702 A1 Apr. 3, 2025

(51) Int. Cl.
*G07B 15/06* (2011.01)

(52) U.S. Cl.
CPC ................... *G07B 15/063* (2013.01)

(58) Field of Classification Search
CPC .......................... G07B 15/063; G06Q 2240/00
USPC ............................................................. 705/13
See application file for complete search history.

(56) References Cited

U.S. PATENT DOCUMENTS

| | | | |
|---|---|---|---|
| 7,347,368 B1* | 3/2008 | Gravelle | G06Q 20/355 235/382 |
| 8,195,506 B2 | 6/2012 | Robinson et al. | |
| 10,311,650 B2 | 6/2019 | Nelson | |
| 11,270,527 B2 | 3/2022 | Borras et al. | |
| 11,308,734 B2 | 4/2022 | Yohalashet | |
| 11,403,886 B2 | 8/2022 | Borras et al. | |
| 2016/0203464 A1* | 7/2016 | Fustes | G07B 15/063 705/13 |
| 2017/0113619 A1* | 4/2017 | Boehm | G07B 15/06 |
| 2024/0152980 A1 | 5/2024 | Borras et al. | |
| 2024/0169768 A1 | 5/2024 | Borras et al. | |

FOREIGN PATENT DOCUMENTS

WO  WO-2018118920 A1 *  6/2018  ............. G06Q 40/08

OTHER PUBLICATIONS

S. S. Al-Ghawi, S. A. Hussain, M. A. Al Rahbi and S. Z. Hussain, "Automatic toll e-ticketing system for transportation systems," 2016 3rd MEC International Conference on Big Data and Smart City (ICBDSC), Muscat, Oman, 2016, pp. 1-5. (Year: 2016)*

* cited by examiner

Primary Examiner — Jeff Zimmerman
Assistant Examiner — Hunter Molnar
(74) Attorney, Agent, or Firm — Terrile, Cannatti & Chambers, LLP; Michael Rocco Cannatti

(57) ABSTRACT

A system, method, and apparatus are provided for dynamically enrolling a vehicle with a tolling authority by transmitting a vehicle toll service enrollment request message to a backend server of a toll managed services server (TMSS) upon detecting that the vehicle has entered onto a proximity corridor area associated with a toll road managed by the tolling authority, and then receiving a vehicle enrollment message from the TMSS after the TMSS determines that the vehicle is not enrolled with the tolling authority and displaying a vehicle enrollment message for viewing by an operator of the vehicle which invites an operator of the vehicle to enroll the vehicle with the tolling authority.

13 Claims, 4 Drawing Sheets

METHOD AND SYSTEM FOR DYNAMIC TOLL AGENCY ENROLLMENT

BACKGROUND OF THE INVENTION

Field of the Invention

The present disclosure is directed in general to the field of vehicle tolling systems. In one aspect, the present disclosure relates to a tollway enrollment apparatus, system and method of operation.

Description of the Related Art

To access toll roads, vehicle drivers pay toll charges to access and use the roads. Conventional toll management systems have used toll collection devices to collect payment of toll charges before accessing a toll road. More recently, automatic toll collection systems are used which enable motorists to register and pay for travel through toll plazas without stopping to pay a toll. Such systems have recently begun to be commercialized and are now familiar to the general public. For example, the E-ZPass toll collection system has been implemented by a consortium of tolling authorities created by the joint efforts and cooperation of the road authorities of different states.

The E-ZPass toll collecting system is characterized by a centrally-located server computer which operates in conjunction with numerous satellite computers located in the various toll plazas to communicate with technically unsophisticated transponders carried in vehicles. In operation, the vehicle transponders are communicatively coupled to be interrogated by signals produced at the toll plazas and to respond to those signals by transmitting a unique "tag number" identifying the transponder. This tag number is then associated with a pre-authorized account number in the central computer which reflects a prepaid dollar balance against which the toll is charged.

Unfortunately, there has been relatively limited adoption of the E-ZPass system due in part to the complexity of a special application process which discourages individuals from using the service. In particular, the application process typically requires communicating with the toll collecting authority, establishing an account for prepaid tolls, meeting credit authorization conditions, etc., all before the applicant receives the transponder. Another challenge with enrolling at existing toll collection systems is the privacy concerns raised by the existing application processes which require the submission of private information. As seen from the foregoing, the existing solutions for quickly and efficiently enrolling with toll collection authorities or their agencies are extremely difficult at a practical level by virtue of the challenges with the existing complexity and time requirements for correctly, efficiently, and accurately enrolling with automatic toll collection systems.

BRIEF DESCRIPTION OF THE DRAWINGS

The present disclosure may be understood, and its numerous objects, features and advantages obtained, when the following detailed description of a preferred embodiment is considered in conjunction with the following drawings.

DETAILED DESCRIPTION

An apparatus, system, architecture, methodology, and program code are described for a vehicle toll management system which enables a vehicle operator to dynamically and efficiently enroll or register with a tolling agency that serves a geographic area or toll road that is being approached by the vehicle. In selected embodiments, a vehicle is configured with an in-vehicle application that communicates over a vehicle network with in-vehicle sensors or databases to detect when the vehicle is approaching a toll network or corridor, and to collect enrollment data, such as a unique vehicle identifier (e.g., VIN) for use with enrolling at a toll agency. In addition, each vehicle may be connected and configured to communicate with a toll management server system to provide and receive enrollment data associated with the vehicle for use in facilitating vehicle enrollment with the tolling agency. In support of such vehicle enrollment functions, the in-vehicle application may be configured to submit an enrollment query, to efficiently display an enrollment application message received from the tolling agency if the vehicle was not previously enrolled, and to facilitate an efficient enrollment of the vehicle with the tolling agency, such as by providing and displaying a single-click option to the vehicle operator to register the vehicle with the tolling agency. If the vehicle operator signals that they wish to register the vehicle, the in-vehicle application sends a message to the tolling agency that includes at least a unique identifier for the vehicle, and may include additional information, such as the registered owner's name, license plate number, and a digital wallet identifier for automated billing associated with tolls incurred by the vehicle on the toll road.

Figure 1:
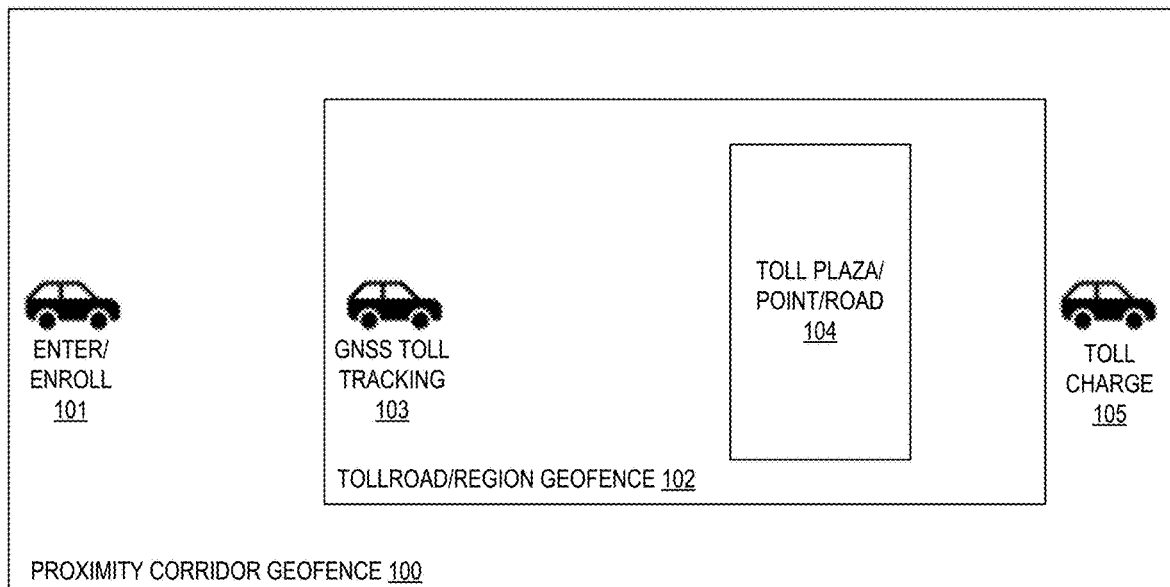
FIG. 1 depicts a system block diagram of a tolling region having geofences which enable efficient registration of a vehicle with a tolling agency that serves a toll road being approached by the vehicle in accordance with selected embodiments of the present disclosure.

To provide additional details for an improved understanding of selected embodiments of the present disclosure, reference is now made to FIG. 1 which depicts a system block diagram 1 of a tolling region having geofences which enable efficient registration of a vehicle with a tolling agency that serves a toll road being approached by the vehicle. Generally speaking, a geofence is a virtual fence or perimeter that is positioned around a physical location that is a region of interest (e.g., toll road(s), congestion region(s), corridors, etc.). Similar to a real fence, a geofence virtually delineates the location or region of interest from the area surrounding it, and can have any shape, including having one or more polygons that are virtually superimposed on a map or area. In addition, a geofence can also detect movement inside the virtual boundary. In accordance with the present disclosure, the geofences may be used to delineate the location of one or more toll roads in a particular geographic area (e.g., city, county, state) that are managed by a toll authority which collects tolls for vehicle use of the toll roads, and the amount of toll charge can vary, depending on a variety of parameters. For example, there can be lower rates charged for vehicles that are pre-registered with the toll authority, and higher rates for vehicles that are not registered. In addition, different toll rates can apply to vehicles with a minimum number of passengers, or with vehicles exceeding a defined axel count, or with vehicles over a weight threshold, or with vehicles which are towing a trailer, etc. In addition, different toll rates may be charged for vehicles driving in high-occupancy tolling lanes, or in designated congestion areas, or in environmentally sensitive areas.

To facilitate efficient registration of a vehicle, the toll management system may virtually demarcate the physical boundaries of the geographic area(s) managed by the toll authority with a proximity corridor geofence 100 that surrounds a set of one or more toll roads associated with the toll authority. For example, the Central Texas Regional Mobility Authority is the toll authority for central Texas and a proximity corridor geofence 100 associated with CTRMA would include a region that encompasses SH 130, SH 45, Mopac 1 Toll, 183A, and the like. In addition, there could be North Texas Tollway Authority (NTTA) which would have a proximity corridor geofence 100 that encompasses all their toll roads. Within each tolling authority's corridor geofence 100, individual toll road or region geofences 102 are virtually defined around individual toll roads 104. The toll road geofence 102 is virtually defined to encompass a particular toll road in the corridor geofence (e.g., Texas 130 would have a toll road geofence that is distinct from Texas 183A's toll road geofence). A region geofence, on the other hand, is defined around a special tolling area. For example, if a city downtown area were a congestion zone subject to tolling, then a region geofence can be virtually defined to encompass that area. Within the toll road/region geofence 102, one or more toll areas (e.g., toll plaza or point or area or road) 104 can be located which are managed and defined by the toll authority (along with non-toll roads).

A function of the proximity corridor geofence 100 is to enable the identification of any unregistered vehicle as it approaches the toll road/region geofence 102 in order to facilitate real-time enrollment of the vehicle while it is moving through the proximity corridor geofence 100. For example, a vehicle 101 that has entered the proximity corridor geofence 100 may be configured to detect that it is within the proximity corridor geofence area and to automatically enroll the vehicle with the toll management system 1 or otherwise verify a current enrollment status of that vehicle with the toll authority associated with the toll network. In the event that a vehicle's enrollment query to the toll management system 1 indicates that that the vehicle registration is not active, the vehicle 101 may be configured to provide an in-vehicle notification to the vehicle operator providing an opportunity to register the vehicle. On an affirmative selection by the vehicle operator, the vehicle is dynamically registered with the agency through, for example, an API interface. Upon entering the toll road/region geofence 102, a registered vehicle 103 may employ global navigation satellite system (GNSS) toll tracking for any toll charges incurred when the vehicle enters a toll area/plaza/point/road 104.

Upon leaving the toll road/region geofence 102 or at any time the vehicle is assessed a toll charge within the toll road/region geofence 102, each registered vehicle 105 may be provided with toll charge information to notify the vehicle operator with real time, transparent information on each toll charge accrued while travelling in a toll area/plaza/point/road 104 within the toll road/region geofence 102.

Figure 2:
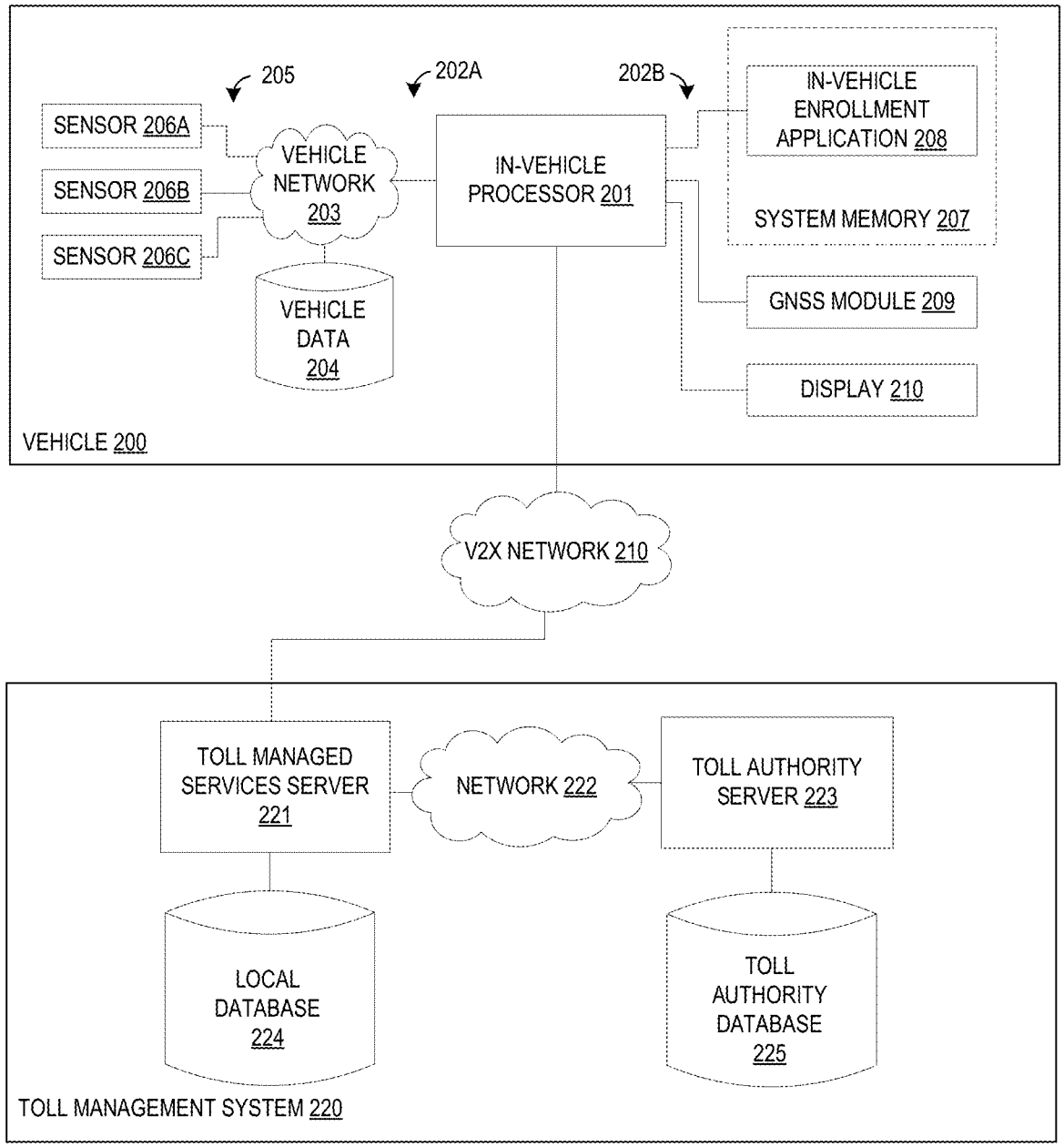
FIG. 2 depicts data processing system components of a vehicle and a toll management system which are communicatively coupled to initiate and complete registration of a vehicle with a tolling agency that serves a geographic area in accordance with selected embodiments of the present disclosure.

To provide additional details for an improved understanding of selected embodiments of the present disclosure, reference is now made to FIG. 2 which depicts data processing system components 2 of a vehicle 200 and a toll management system 220 which are communicatively coupled to initiate and complete registration of a vehicle with a tolling agency that serves a geographic area. As disclosed herein, the method and system for dynamically enrolling the vehicle 200 with the toll management system 220 may be implemented entirely in selected hardware, entirely in software (including firmware, resident software, micro-code, etc.) or in embodiments combining software and hardware aspects that may all generally be referred to herein as a "circuit," "module" or "system." Certain implementations may incorporate all, fewer, or greater than the components described herein.

The depicted data processing system components in the vehicle 200 include one or more in-vehicle processor units 201 that are coupled, respectively, over one or more system bus connectors 202A, 202B to a vehicle network 203, system memory 207, a GNSS module 209, and an information display 210, thereby forming an automotive vehicle network. The processor unit(s) 201 can have various architectures, such as a system on a chip (SOC), electronic control unit (ECU), general-purpose processor, multiprocessor, custom compute accelerator, FPGA, hard-wired ASIC, etc. In other embodiments, the vehicle processor unit 201 may be embodied with processor/transceiver that is part of the vehicle (e.g., infotainment system), or a processor/transceiver that is within the vehicle (e.g., a mobile phone that has access to the CAN sensors or a dongle attached to the OBDII port).

Through the vehicle network 203, the processor unit(s) 201 are coupled over one or more in-vehicle network (IVN) bus connectors 205 to one or more sensors 206A-C and a vehicle data storage device 204. Examples of IVN bus connectors 205 include, but are not limited to, Controller Area Network (CAN) bus, CAN with Flexible Data-Rate (CAN FD) bus, CAN data link layer protocol (CAN XL) bus, Local Interconnect Networks (LIN) bus, FlexRay bus, Ethernet-based network buses, and other types. For example, a CAN bus is a message-based communications bus protocol that is often used within automobiles to enable communications between various electronic control units (ECUs) which perform various control applications, such as for airbags, antilock brakes, cruise control, electric power steering, audio systems, windows, doors, mirror adjustment, battery and recharging systems for hybrid/electric cars, and many more. The CAN bus protocol is used to enable communications between the various bus devices.

As disclosed herein, the sensor(s) 206 may be connected and configured to monitor, track, extract, or collect toll-related information which can be used for calculation of the toll charges for the vehicle. Example sensor data includes, but is not limited to vehicle location, vehicle occupancy, towing status, fuel type, miles driven, vehicle weight, number of axles, use of high occupancy vehicle lane, and the like. For example, a first sensor 206A may be a camera which detects the lane where a vehicle is travelling, or detects if a trailer is attached to the vehicle, or detects the number of passengers in a vehicle. In addition, a second sensor 206B may be one or more seatbelt sensors or airbag sensors which detect how many passengers are sitting in the vehicle. In addition, a third sensor 206C may be a weight or suspension sensor which detects the vehicle occupancy, towing status, etc. In addition or in the alternative, the sensor(s) 206 may include one or more short and long range radar, camera or lidar sensors.

As disclosed herein, vehicle data storage device 204 may be connected and configured to store unique vehicle identification information (e.g., VIN, vehicle operator name, vehicle license plate number, and the like) or other toll-related information (e.g., vehicle type, chassis type, vehicle ID, vehicle design, vehicle weight, number of axels, low emission engine type, etc.). For example, the vehicle data storage device 204 may include information specifying if the vehicle is an electric or internal combustion or low emission vehicle. In addition, the vehicle data storage device 204 may store data identifying one or more proximity corridor geofence areas or toll road/region geofence areas which are used to evaluate a current location of the vehicle in relation to the geofence area(s). In addition, the vehicle data storage device 204 may store a digital wallet identifier (e.g., Google Pay or Apple Pay or an OEM associated payments system) for automated billing associated with tolls incurred by the vehicle within the corridor geofence.

In accordance with selected embodiments of the present disclosure, the vehicle 200 includes a vehicle location sensor, such as a global navigation satellite system (GNSS) module 209 (e.g., GPS, Galileo, BeiDou, or QZSS) which includes circuitry to perform geolocation functionality. There might be mapping information in the system memory 207, or that could be part of the in-vehicle application 208.

In accordance with selected embodiments of the present disclosure, the vehicle 200 includes a system memory 207 that is populated with data or programming code, including but not limited to operating system (OS) and software programs and any other applications executed by the in-vehicle processor unit(s) 206 for the vehicle 200. In particular, the software programs stored in system memory 207 may include an in-vehicle enrollment application 208. The in-vehicle enrollment application 208 can, for example, take the form of embedded software running on an infotainment processor of the vehicle 200 that is coupled to a display viewable by a vehicle operator or another processing device that has access to data from the vehicle sensors 206 or data from the data storage device 204. In addition, the in-vehicle enrollment application 208 has access to location data generated by the GNSS module 209 to specify a geographic location of the vehicle 200.

In selected embodiments, the in-vehicle enrollment application 208 employs the GNSS module 209 to detect when the vehicle enters a proximity corridor geofence, to submit an enrollment status query to the toll management system 220 for purposes of determining if the vehicle is registered with the affiliated tolling agency, and to receive and process any vehicle enrollment application form or message from the toll management system 220 to efficiently enroll the vehicle with the affiliated tolling agency. In addition, the in-vehicle enrollment application 208 employs one or more in-vehicle sensors 206 to monitor the location of the vehicle 200 on the toll road and to provide toll-related data to the toll management system 220 associated with toll criteria in that location for purposes of dynamically tracking and adjusting toll charges for the vehicle 200 based on toll-related information that is tracked, extracted, or collected from the sensors 206.

In selected embodiments, dynamic enrollment of the vehicle 200 with the toll management system 220 may require information that is external to the vehicle 200. To this end, the in-vehicle enrollment application 208 may be connected and configured to communicate over a vehicle-to-everything (V2X) network 211 with the toll management system 220 that has access to a local database 224 storing information identifying registered users of the toll authority. As will be appreciated, the V2X network 210 may be implemented with other networks, such as a vehicle-to-infrastructure (V2I) network or a vehicle-to-network (V2N) or Vehicle to Connected Vehicle Network (V2CVN). To this end, the toll management system 220 may include a backend toll managed services server (TMSS) 221 that communicates not only with the local database 224, but also communicates over network 222 with a toll authority server 223 that stores identification of all registered users of the toll authority in a toll authority database 225.

Once connected over the V2X network 211, the in-vehicle enrollment application 208 can provide geographic location information to the TMSS 221 in order to determine where the vehicle 200 is currently located in relating to any proximity corridor or toll road area. This may be done by comparing the geographic location for the vehicle 200 with toll road geofences defined at the TMSS 221. Alternatively, the toll road geofence data can be stored in memory accessible to the in-vehicle enrollment application 208 (e.g., database 204) and the determination of whether the vehicle is currently traveling along a toll road can be made by the in-vehicle enrollment application 208.

When the vehicle 200 is traveling within a corridor geofence, the in-vehicle enrollment application 208 can then use the V2X network 211 to query the TMSS 221 whether the vehicle 201 is registered with the toll authority associated with the proximity corridor geofence. The query submitted by the vehicle 200 includes a unique identifier for the vehicle that is either pulled from vehicle database 204 (e.g., a VIN) or previously stored by the in-vehicle enrollment application 208 (e.g., a license plate number). The TMSS 221 can use the unique identifier to determine whether the vehicle 200 is registered on the TMSS 221 by performing a lookup on a local database 224 to the toll managed services server 221. The unique identifier can also be used to perform a reverse lookup for another identifier with which the local database is indexed (e.g., vehicle operator name, vehicle license plate number, and the like). In the event that the TMSS 221 does not have the vehicle in the local database 224, the TMSS 221 can communicate with a toll authority server 223 to request a search for the vehicle on a toll authority database 225. If the toll authority has the vehicle registered, the TMSS 225 can use information from the toll authority server 223 to add a registration entry in the local database 224 to the toll managed services server 221.

If the vehicle 200 is not registered to the toll authority, the TMSS 221 will transmit a message to the in-vehicle enrollment application 208 that the vehicle 200 is not registered. In response to that message, the in-vehicle enrollment application 208 can display a query asking if the vehicle operator would like to register the vehicle to the toll authority associated with the corridor geofence. The in-vehicle enrollment application 208 can provide a single-click option to the vehicle operator to register the vehicle.

If the vehicle operator signals that they wish to register the vehicle 200, a message will be sent from the vehicle 200 to the TMSS 221 that includes at least a unique identifier for the vehicle, and, if available, the registered owner's name, and a license plate number. If available, a digital wallet identifier (e.g., Google Pay or Apple Pay or an OEM associated payments system) will be provided for automated billing associated with tolls incurred by the vehicle within the corridor geofence. This stage of query and response within the vehicle 200 is intended to be brief because the vehicle is in motion and the driver's attention should not be distracted from driving. If additional information is required beyond what is available to the in-vehicle enrollment application 208 at this time, more detailed queries to the vehicle operator will be provided once the vehicle is stopped (e.g., the in-vehicle application receives an indication from one or more sensors 206 that the vehicle is parked).

Upon receipt of the vehicle operator response, the TMSS 221 will store the unique identifier and other information in an entry in the local database 224. Once the entry is complete, information associated with that entry can be provided to the toll authority server 223 for storage in the toll authority database 225.

As will be appreciated, if the exchange of messages confirms that the vehicle 200 is already be registered at the TMSS 221 or the toll authority server 223, there is no need for the in-vehicle registration steps, and the process will complete with a verification of registration message sent to the in-vehicle enrollment application 208.

The data processing system components 201-209, 221-225 depicted in the vehicle 200 and the toll management system 220 are not intended to be exhaustive, but rather are representative to highlight components that can be implemented by the present disclosure. For instance, the data processing system components may include alternate memory storage devices. In addition, multiple in-vehicle processor devices may be used to run the in-vehicle enrollment application 208 and a separate vehicle infotainment system. And though not shown, it will be appreciated that the in-vehicle processor unit(s) may be coupled over audio/video adapter modules to input/output devices, including but not limited to one or more display screens or audio input/output devices associated with a vehicle infotainment system. These and other variations are intended to be within the spirit, scope and intent of the present disclosure.

Figure 3:
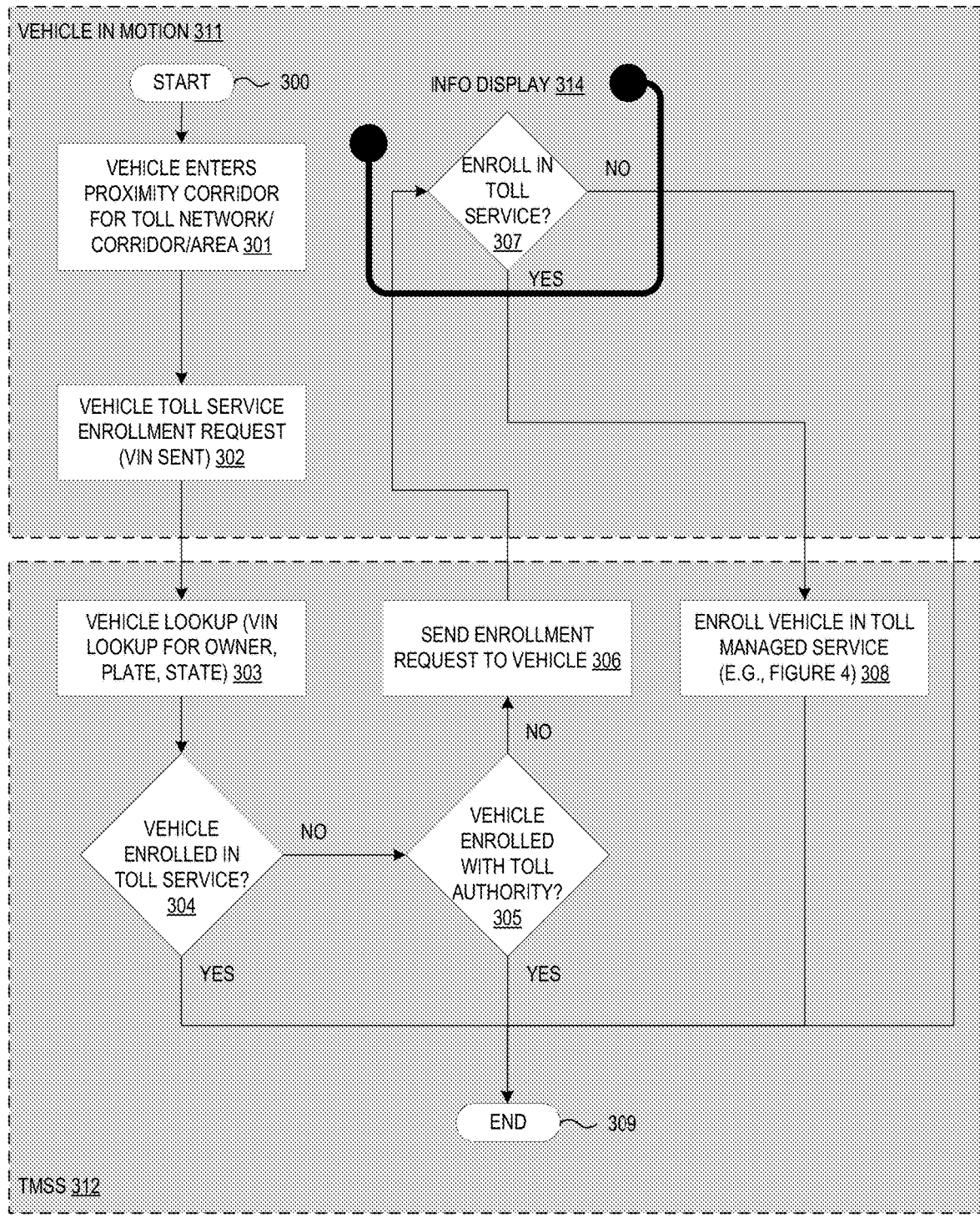
FIG. 3 depicts a simplified flow chart showing the logic for initiating the enrollment of a vehicle with a toll management system as the vehicle approaches a toll road in accordance with selected embodiments of the present disclosure.

To provide additional details for an improved understanding of selected embodiments of the present disclosure, reference is now made to FIG. 3 which depicts a simplified flow chart 3 showing the logic for initiating the enrollment of a vehicle with a toll management system as the vehicle approaches a toll road. In an example embodiment, the control logic and methodology shown in FIG. 3 may be implemented in whole or in part with hardware or software on an electronic control unit (ECU), microcontroller unit, or digital system processor that includes processor and memory for storing programming control code for controlling the operation of a vehicle which is communication with a toll management system. An embodiment of a method for dynamically and efficiently enrolling or registering vehicles may include steps 300-309 shown in the general order of FIG. 3, though the method may include more or fewer steps or can arrange the order of the steps differently than those shown. Generally, the method starts with a start operation 300 and ends with step 309 after processing steps 301-308 which are executed as a set of computer-executable instructions by one or more computer systems or processors and encoded or stored in one or more memories which include a computer readable medium. In other configurations, the method may be executed by a series of components, circuits, and gates created in a hardware device, such as a System of Chip (SOC), Application Specific Integrated Circuit (ASIC), or a Field Programmable Gate Array (FPGA). In other configurations, the method may be executed as an iterative loop where the processing steps 301-308 are periodically repeated on a predetermined schedule or on certain triggering events or when prompted by a vehicle driver.

Once the vehicle drive system starts and is operational at step 300, the vehicle's on-board sensors are activated to collect sensor data reflecting the vehicle operation, status, location, or other toll-related information. In selected embodiments, the sensor data signals may be provided by vehicle's on-board sensors 206A-C and GNSS module 209 to the system processor 201 which runs the in-vehicle enrollment application 208.

At step 301, a vehicle in motion 311 enters a proximity corridor area surrounding a toll network, corridor, facility or area. In selected embodiments, the vehicle (e.g., 101) detects that it has entered a proximity corridor area (e.g., 100) by using an in-vehicle enrollment application and location mapping service (e.g., 208) to monitor the location of the vehicle in relation to a proximity corridor geofence area (e.g., 100) associated with a toll road, network, corridor, facility or area (e.g., 102). Alternatively, a vehicle location system within the vehicle 311 may detect the vehicle's proximity to the toll network, or entry of the vehicle into the toll network at step 301.

At step 302, the vehicle in motion 311 generates a vehicle toll service enrollment request over the V2X 312 to the TMSS 312. In selected embodiments, an in-vehicle enrollment application (e.g., 208) issues the vehicle toll service enrollment request using a vehicle-to-infrastructure network (e.g., 211) to query the TMSS (e.g., 221) whether the vehicle (e.g., 200) is registered with the toll authority associated with the corridor geofence where the vehicle 311 is located. The query may include a unique identifier for the vehicle 311 that is either pulled from vehicle data storage 204 (e.g., a VIN) or previously stored by the in-vehicle application (e.g., a license plate number) 208.

At step 303, the TMSS 312 performs a vehicle lookup operation using the unique identifier for the vehicle 311. In selected embodiments, the TMSS (e.g., 221) can use the unique identifier to perform a lookup on a local database (e.g., 224) to determine whether the vehicle 311 is registered on the TMSS 312. In other embodiments, the unique identifier can be used to perform a reverse lookup for another identifier with which the local database is indexed (e.g., vehicle operator name, vehicle license plate number, and the like).

At step 304, the TMSS 312 determines if the vehicle 311 is enrolled in the toll service. If the vehicle is enrolled in a toll service (affirmative outcome to vehicle lookup 303), then there is no need for additional vehicle enrollment steps, and the enrollment process ends at step 309. At this point, an enrollment verification of registration message may be sent to the in-vehicle enrollment application at the vehicle 311 (not illustrated). However, if the TMSS 312 determines that the vehicle is not enrolled in a toll service (negative outcome to vehicle lookup 303), this indicates that the TMSS does not have the vehicle in the local database, and the toll authority can be queried to determine if the vehicle 311 is enrolled with the toll authority server which may be prompted by having the TMSS (e.g., 221) send a query message (not shown) to the toll authority server (e.g., 223).

At step 305, the TMSS 312 determines if the vehicle 311 is enrolled in with the toll authority service. In selected embodiments, the TMSS can communicate with a toll authority server to request a search for the vehicle on a database associated with the toll authority. If the vehicle is enrolled in a toll authority service (affirmative outcome to detection step 305), then there is no need for additional vehicle enrollment steps, and the enrollment process ends at step 309. At this point, the TMSS 312 can use information from the toll authority server to add a registration entry in the database local to the TMSS 312 (negative outcome to detection step 305). However, if the TMSS 312 determines that the vehicle is not enrolled in a toll authority service, this indicates that the vehicle 311 is not enrolled with the TMSS or the toll authority server.

If the vehicle is not registered to the toll authority or the TMSS, the TMSS 312 may transmit a message over the V2X network (e.g., 211) to the vehicle in motion 311 at step 306. In selected embodiments, the enrollment request may include a message that the TMSS (e.g., 221) transmits to the in-vehicle enrollment application (e.g., 208) to indicate that the vehicle 311 is not registered.

At step 307, the operator of the vehicle in motion 311 is invited to enroll the vehicle 311 with the toll authority associated with the corridor geofence where the vehicle 311 is located. In selected embodiments, the vehicle 311 may include an in-vehicle enrollment application (e.g., 208) which is configured to display a query on an information display 314 which invites the vehicle operator to register or enroll the vehicle 311 with to the toll authority associated with the corridor geofence. In selected embodiments, the in-vehicle enrollment application (e.g., 208) can provide a single-click option to register the vehicle which is displayed on the information display (e.g., 210) for viewing by the vehicle operator.

If the vehicle operator declines to enroll the vehicle (negative outcome to detection step 307), then the enrollment process ends (step 309) and the vehicle 311 will operate in the toll road area without being registered, thereby incurring higher toll charges for unregistered vehicles. In the event the operator declines enrollment, a message can be sent to the TMSS 312 indicating that the vehicle operator did not wish to register the vehicle, and an entry can be made in the local TMSS database signifying the operator's decision to not enroll.

However, if the vehicle operator enrolls the vehicle (affirmative outcome to detection step 307), then the vehicle 311 sends a request to the TMSS 312 to enroll the vehicle in the toll managed service (step 308). In selected embodiments, the vehicle 311 sends a message to the TMSS 312 that includes at least a unique identifier for the vehicle, and, if available, the registered owner's name, and a license plate number. If available, a digital wallet identifier (e.g., Google Pay or Apple Pay or an OEM associated payments system) will be provided for automated billing associated with tolls incurred by the vehicle 311 within the corridor geofence. This stage of query and response within the vehicle 311 is intended to be brief because the vehicle 311 is in motion and the driver's attention should be focused on driving the vehicle 311. If additional information is required beyond what is available to the in-vehicle enrollment application at this time, more detailed queries to the vehicle operator will be provided once the vehicle is stopped (e.g., the in-vehicle application receives an indication that the vehicle is parked).

Figure 4:
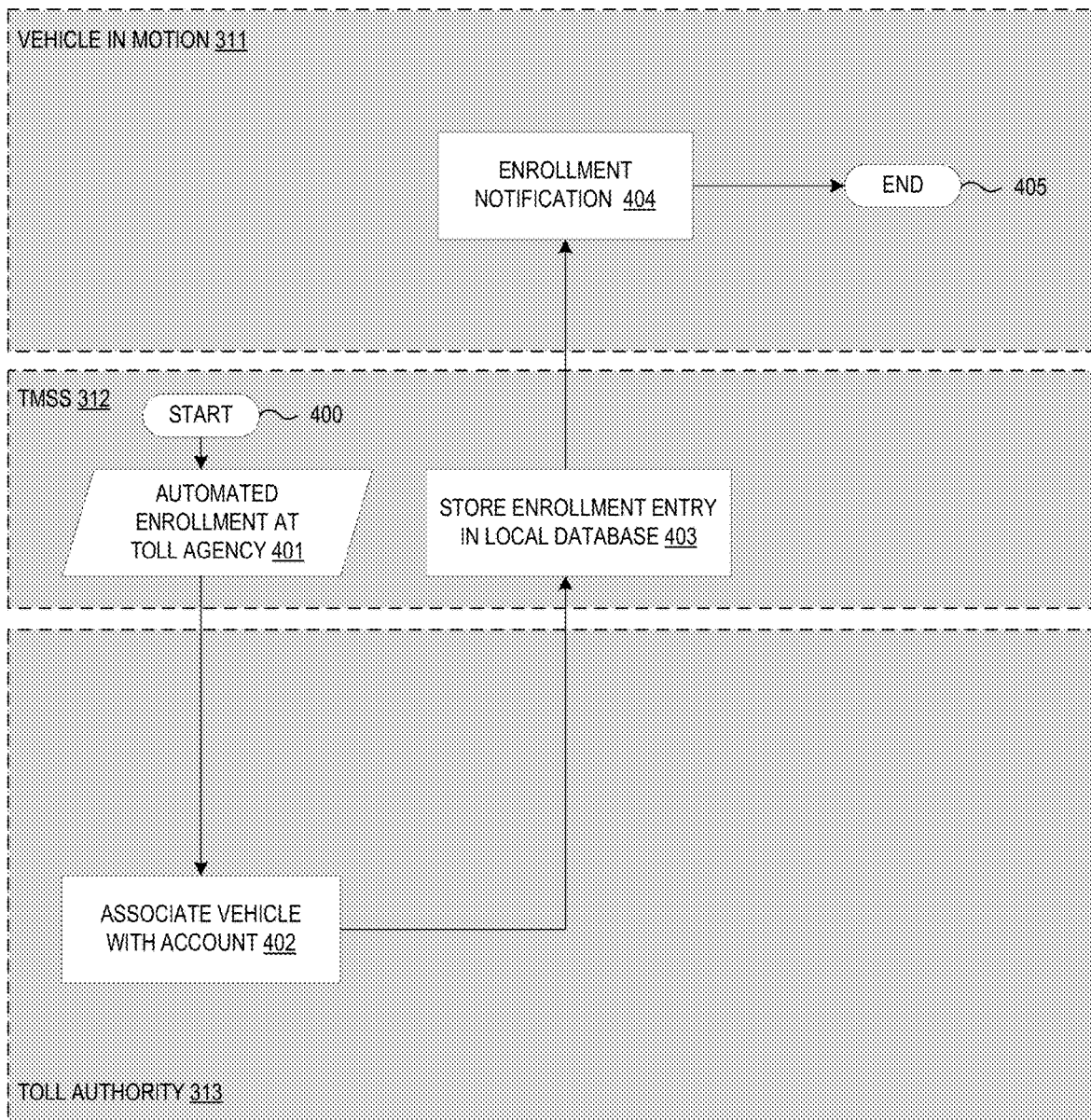
FIG. 4 depicts a simplified flow chart showing the logic for automatic enrollment of a vehicle with a toll management system in accordance with selected embodiments of the present disclosure.

To provide additional details for an improved understanding of selected embodiments of the present disclosure, reference is now made to FIG. 4 which depicts a simplified flow chart 4 showing the logic for automatic enrollment of a vehicle with a toll management system. In an example embodiment, the control logic and methodology shown in FIG. 4 may be implemented in whole or in part with hardware or software on an electronic control unit (ECU), microcontroller unit, or digital system processor that includes processor and memory for storing programming control code for controlling the operation of a vehicle which is communication with a toll management system. An embodiment of a method for automatically enrolling a vehicle may include steps 400-405 shown in the general order of FIG. 4, though the method may include more or fewer steps or can arrange the order of the steps differently than those shown. Generally, the method starts with a start operation 400 and ends with step 405 after processing steps 401-404 which are executed as a set of computer-executable instructions by one or more computer systems or processors and encoded or stored in one or more memories which include a computer readable medium. In other configurations, the method may be executed by a series of components, circuits, and gates created in a hardware device, such as a System of Chip (SOC), Application Specific Integrated Circuit (ASIC), or a Field Programmable Gate Array (FPGA). In other configurations, the method may be executed as an iterative loop where the processing steps 401-405 are periodically repeated on a predetermined schedule or on certain triggering events or when prompted by a vehicle driver opting to enroll a vehicle with a toll managed service.

Once the vehicle enrollment process starts at step 400, the TMSS 312 invokes an automated service to enroll the vehicle 311 at the toll authority (step 401). In selected embodiments, the automated enrollment service step 401 uses the information provided by the vehicle 311, such as the unique identifier for the vehicle, the registered owner's name, a license plate number, and digital wallet identifier, if available, to enroll the vehicle 311 with the toll authority server 313 which manages the toll point, network, corridor, or area associated with the proximity corridor fence where the vehicle 311 is located. As will be appreciated, the information (e.g., unique identifier, etc.) used by the automated enrollment service 401 may be stored by the TMSS (e.g., 221) at a local database (e.g., 224), and then shared with the toll authority server (e.g., 223).

At step 402, toll authority server 313 associates the vehicle 311 with an existing account at the tolling authority, such as by creating an account for the vehicle 311. In selected embodiments, the toll authority server 313 performs the vehicle/account association step 402 by accessing the unique identifier and other information in an enrollment entry that is stored in a database (e.g., 225) associated with the toll authority server (e.g., 223).

At step 403, the completed enrollment entry information from the toll authority server 313 may optionally be stored at the TMSS 312. In selected embodiments, the completed enrollment information may be stored by the TMSS (e.g., 221) at the local TMSS database (e.g., 224).

At step 404, an enrollment notification may optionally be provided to the vehicle 311. In selected embodiments, the vehicle 311 may notify an operator of the vehicle that the vehicle is registered with the toll authority 313 by displaying an enrollment notification message on the vehicle infotainment display. At step 405, the enrollment process ends.

Subsequent to vehicle registration or enrollment with the TMSS 312, communication can continue between the vehicle 311 and the TMSS 312 to exchange toll-related information associated with, for example, geo-tolling (entry and exit from toll-specific geofences), road usage charging (entry, exit, and distance travelled in RUC zones), congestion zone travel (entry, exit, distance, fuel type in congestion zones), and high occupancy tolling (entry, exit, number of passengers as determined by in-vehicle sensors in HOT zones). In each of these scenarios, the vehicle 311 tracks geographic location for the vehicle 311 that is collected by on-board sensors, including a vehicle location sensor (e.g., GNSS module) that may be accessed by the in-vehicle application. In such embodiments, the in-vehicle application (which can be the same or different application from the in-vehicle enrollment application) provides geographic location data periodically to the toll managed services server. The toll managed services server can use the geographic location data to determine when the vehicle is passing through a toll zone. In addition, the TMSS can signal the in-vehicle application to increase the frequency of GNSS location gathering so as to enhance the accuracy of vehicle location while in the toll zone. Information associated with the toll zone, such as the toll cost, can be provided from the toll managed services server to the in-vehicle application to be displayed to the vehicle operator for toll transparency.

As will be appreciated, the disclosed vehicle enrollment system does not require that the actual vehicle tolling use an on-board vehicle location sensor (e.g., GNSS module) to detect vehicle usage of toll roads. For example, a conventional, physical facility-based tolling system may be used for charging a vehicle for using the toll roads, but the tolling authority can define a virtual corridor geofence for a geographic area that includes the physical-facility-based tolling system. In addition, the disclosed vehicle enrollment system can be used with non-tolling applications, such as enrolling a vehicle with a parking applications or other zone-related applications.

By now it should be appreciated that there has been provided an apparatus, method, program code, and system for dynamically enrolling a vehicle with a tolling authority. In the disclosed method, a vehicle processor detects that the vehicle has entered onto a proximity corridor area associated with a toll road managed by the tolling authority. In selected embodiments, the vehicle detects it has entered onto the proximity corridor area by collecting vehicle location data from an in-vehicle sensor and comparing the vehicle location data to a virtual geofence map defining the proximity corridor area. In addition, the vehicle processor transmits a vehicle toll service enrollment request message to a remote toll managed services server (TMSS) associated with the tolling authority in response to detecting that the vehicle has entered onto the proximity corridor area. In selected embodiments, the vehicle processor transmits the vehicle toll service enrollment request message by transmitting a unique identifier for the vehicle that is retrieved from vehicle data stored on the vehicle. In addition, the vehicle processor receives a vehicle enrollment message from the TMSS after the TMSS determines that the vehicle is not enrolled with the tolling authority. In selected embodiments, the vehicle toll service enrollment request message, the vehicle enrollment message, and the vehicle registration invitation message are sent over wireless connection, such as a vehicle-to-everything (V2X) network, between the vehicle and the TMSS. In addition, the vehicle processor displays a vehicle registration invitation message which invites an operator of the vehicle to enroll the vehicle with the tolling authority in response to receiving the vehicle enrollment message from the TMSS. In selected embodiments, the vehicle registration invitation message includes a single-click vehicle enrollment option for enrolling the vehicle with the tolling authority. In addition, the vehicle processor transmits a vehicle registration message to automatically register the vehicle with the tolling authority. In such embodiments, the vehicle processor may be configured to automatically populate the vehicle registration message with a unique identifier for the vehicle, alone or in combination with a digital wallet identifier for automated billing associated with tolls incurred by the vehicle within the proximity corridor area. In selected embodiments, the vehicle processor automatically populates the vehicle registration message with a unique identifier for the vehicle, and then subsequently transmits a registration payment message which includes a digital wallet identifier for automated billing associated with tolls incurred by the vehicle within the proximity corridor area. In selected embodiments, the vehicle processor is further configured to transmit a first message to the TMSS with location data indicating the vehicle has entered onto a toll area associated with the TMSS. In addition, the vehicle processor may be further configured to collect toll-related data for the vehicle while operating in the toll area by executing a tolling application program on the vehicle processor to access one or more in-vehicle sensors and an in-vehicle data storage device. In addition, the vehicle processor may be further configured to transmit a second message to the TMSS with the toll-related data. In addition, the vehicle processor may be further configured to receive a third message from the TMSS with a toll charge, and to display the toll charge at a display on the vehicle.

In another form, there has been provided an apparatus, method, program code, and system for dynamically enrolling a vehicle with a vehicle charging authority system. In the disclosed method, a backend server of a vehicle charging authority service (VCAS) receives a vehicle service enrollment request message which includes data associated with a vehicle that has entered a proximity corridor area associated with the VCAS. In selected embodiments, the vehicle service enrollment request message includes a unique identifier for the vehicle that is retrieved from vehicle data stored on the vehicle. In selected embodiments, the vehicle detects entry into the proximity corridor area by collecting vehicle location data from an in-vehicle GNSS sensor and comparing the vehicle location data to a virtual geofence map defining the proximity corridor area. In addition, the backend server of the VCAS determines that the vehicle is not registered with the VCAS. In addition, the backend server of the VCAS transmits a vehicle registration invitation which notifies an operator of the vehicle that the vehicle is not registered with the VCAS and invites the operator of the vehicle to enroll the vehicle with the VCAS. In selected embodiments, the vehicle registration invitation message is displayed for viewing by the operator of the vehicle as a single-click vehicle enrollment option for enrolling the vehicle with the VCAS. In addition, the backend server of the VCAS receives a vehicle registration message to register the vehicle with the VCAS, and then enrolls the vehicle with the VCAS using information contained in the vehicle registration message. In selected embodiments, the backend server of the VCAS receives the vehicle service enrollment request message and the vehicle registration message over a wireless communication network, such as a vehicle-to-everything (V2X) network connecting the vehicle to the backend server of the VCAS. In selected embodiments, the VCAS is a toll managed services server (TMSS) having tolling authority over one or more tollways located in the proximity corridor area. In other embodiments, the VCAS is a road usage charging (RUC) managed services server (RMSS) having road use charging authority over one or more RUC zones located in the proximity corridor area.

In yet another form, there has been provided a vehicle enrollment management system, apparatus, method, and program code. The disclosed vehicle enrollment management system includes a vehicle having a processor connected over an in-vehicle network to retrieve in-vehicle data from a vehicle data storage and one or more in-vehicle sensors, where the vehicle is wirelessly coupled to communicate with a vehicle enrollment authority computer that is operable to dynamically enroll a vehicle with a vehicle charging authority service (VCAS). As disclosed, the vehicle processor transmits a vehicle service enrollment request message indicating the vehicle has entered into a proximity corridor area associated with the VCAS. In addition, the vehicle processor receives, from the vehicle enrollment authority computer, a vehicle registration invitation message after the vehicle enrollment authority computer determines that the vehicle is not registered with the VCAS. In response, the vehicle processor is configured to display the vehicle registration invitation message at a vehicle display to invite the operator of the vehicle to enroll the vehicle with the VCAS with a single-click enrollment option which sends a vehicle registration message to automatically register the vehicle with the VCAS by automatically populating the vehicle registration message with a unique identifier for the vehicle and a digital wallet identifier for automated billing associated with charges incurred by the vehicle within the proximity corridor area.

Although the described exemplary embodiments disclosed herein focus on a toll management system which can be used with a V2X-enabled vehicle to dynamically and efficiently enroll or register a vehicle with a tolling authority that serves a geographic area or toll road that is being approached by the vehicle, the present disclosure is not necessarily limited to the example embodiments illustrate herein and may be applied to any toll charging system. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for dynamically enrolling a vehicle with a tolling authority, comprising:
    detecting, by a vehicle processor, that the vehicle has entered onto a proximity corridor area associated with a toll road managed by the tolling authority;
    transmitting, by the vehicle processor, a vehicle toll service enrollment request message to a remote toll managed services server (TMSS) associated with the tolling authority in response to said detecting that the vehicle has entered onto the proximity corridor area;
    receiving, by the vehicle processor, a vehicle enrollment message from the TMSS after the TMSS determines that the vehicle is not enrolled with the tolling authority; and
    displaying, by the vehicle processor, a vehicle registration invitation message on a vehicle display which invites an operator of the vehicle to enroll the vehicle with the tolling authority in response to said receiving the vehicle enrollment message from the TMSS, where the vehicle registration invitation message comprises a single-click enrollment option for enrolling the vehicle with the tolling authority;
    receiving, by the vehicle processor, a selection of an element associated with the single-click enrollment option on the vehicle display which causes the vehicle processor to automatically populate a vehicle registration message with a unique identifier for the vehicle and a digital wallet identifier for automated billing associated with charges incurred by the vehicle within the proximity corridor area, and
    transmitting, by the vehicle processor, the vehicle registration message to automatically register the vehicle with the tolling authority.

2. The method of claim 1, wherein the vehicle toll service enrollment request message, the vehicle enrollment message, and the vehicle registration invitation message are sent over a wireless connection between the vehicle to the TMSS.

3. The method of claim 1, where detecting that the vehicle has entered onto the proximity corridor area comprises collecting vehicle location data from an in-vehicle global navigation satellite system (GNSS) sensor and comparing the vehicle location data to a virtual geofence map defining the proximity corridor area.

4. The method of claim 1, wherein transmitting the vehicle toll service enrollment request message comprises transmitting the unique identifier for the vehicle that is retrieved from vehicle data stored on the vehicle.

5. The method of claim 1, where the vehicle processor transmits a registration payment message which includes a digital wallet identifier for automated billing associated with tolls incurred by the vehicle within the proximity corridor area.

6. The method of claim 1, where the vehicle processor is further configured to:
    transmit a first message to the TMSS with location data indicating the vehicle has entered onto a toll area associated with the TMSS;
    collect toll-related data for the vehicle while operating in the toll area by executing a tolling application program on the vehicle processor;
    transmit a second message to the TMSS with the toll-related data;
    receive a third message from the TMSS with a toll charge; and
    display the toll charge at a display on the vehicle.

7. A method for dynamically enrolling a vehicle with a vehicle charging authority system, comprising:
    receiving, by a backend server of a vehicle charging authority service (VCAS), a vehicle service enrollment request message, wherein the vehicle service enrollment request message comprises data associated with a vehicle that has entered a proximity corridor area associated with the VCAS;
    determining, by the backend server of the VCAS, that the vehicle is not registered with the VCAS;
    transmitting, by the backend server of the VCAS, a vehicle registration invitation message which notifies an operator of the vehicle that the vehicle is not registered with the VCAS and invites the operator of the vehicle to enroll the vehicle with the VCAS, where the vehicle registration invitation message is displayed on a vehicle display and comprises a single-click enrollment option for enrolling the vehicle with the VCAS;

receiving, by the backend server of the VCAS, a vehicle registration message to register the vehicle with the VCAS where the vehicle registration message is automatically populated with a unique identifier for the vehicle and a digital wallet identifier for automated billing associated with charges incurred by the vehicle within the proximity corridor area in response to a selection on the vehicle display of an element associated with the single-click enrollment option by the operator of the vehicle; and enrolling, by the backend server of the VCAS, the vehicle with the VCAS using information contained in the vehicle registration message.

8. The method of claim 7, wherein the VCAS is a toll managed services server (TMSS) having tolling authority over one or more tollways located in the proximity corridor area.

9. The method of claim 7, wherein the VCAS is a road usage charging (RUC) managed services server (RMSS) having road use charging authority over one or more RUC zones located in the proximity corridor area.

10. The method of claim 7, wherein the backend server of the VCAS receives the vehicle service enrollment request message and the vehicle registration message over a vehicle-to-everything (V2X) network connecting the vehicle to the backend server of the VCAS.

11. The method of claim 7, where the vehicle detects entry into the proximity corridor area by collecting vehicle location data from an in-vehicle global navigation satellite system (GNSS) sensor and comparing the vehicle location data to a virtual geofence map defining the proximity corridor area.

12. The method of claim 7, where the vehicle service enrollment request message comprises the unique identifier for the vehicle that is retrieved from vehicle data stored on the vehicle.

13. A vehicle enrollment management system, comprising:
- a vehicle comprising a processor connected over an in-vehicle network to retrieve in-vehicle data from a vehicle data storage and one or more in-vehicle sensors, where the vehicle is wirelessly coupled to communicate with a vehicle enrollment authority computer that is operable to dynamically enroll a vehicle with a vehicle charging authority service (VCAS),
- wherein the vehicle processor transmits a vehicle service enrollment request message indicating the vehicle has entered into a proximity corridor area associated with the VCAS;
- wherein the vehicle processor receives, from the vehicle enrollment authority computer, a vehicle registration invitation message after the vehicle enrollment authority computer determines that the vehicle is not registered with the VCAS;
- wherein the vehicle processor is configured to display the vehicle registration invitation message at a vehicle display to invite the operator of the vehicle to enroll the vehicle with the VCAS with a single-click enrollment option for enrolling the vehicle with the VCAS;
- wherein the vehicle processor receives a selection on the vehicle display of an element associated with the single-click enrollment option by the operator of the vehicle which causes the vehicle processor to automatically populate a vehicle registration message with a unique identifier for the vehicle and a digital wallet identifier for automated billing associated with charges incurred by the vehicle within the proximity corridor area; and
- wherein the vehicle processor is configured to send the vehicle registration message to automatically register the vehicle with the VCAS.

* * * * *